(12) United States Patent
D'Alfonso et al.

(10) Patent No.: US 11,348,145 B2
(45) Date of Patent: May 31, 2022

(54) PREFERENCE-BASED RE-EVALUATION AND PERSONALIZATION OF REVIEWED SUBJECTS

(71) Applicant: International Business Machines Corporation, Armonk, NY (US)

(72) Inventors: Fabio D'Alfonso, Rome (IT); Agostino Sturaro, Cona (IT); Francesco Lupini, Rome (IT); Valentina Sessa, Rome (IT)

(73) Assignee: International Business Machines Corporation, Armonk, NY (US)

( * ) Notice: Subject to any disclaimer, the term of this patent is extended or adjusted under 35 U.S.C. 154(b) by 214 days.

(21) Appl. No.: 16/131,147

(22) Filed: Sep. 14, 2018

(65) Prior Publication Data
US 2020/0090233 A1 Mar. 19, 2020

(51) Int. Cl.
*G06Q 30/02* (2012.01)
*G06Q 30/06* (2012.01)
*G06F 16/2457* (2019.01)

(52) U.S. Cl.
CPC ... *G06Q 30/0282* (2013.01); *G06F 16/24573* (2019.01); *G06F 16/24578* (2019.01); *G06Q 30/0627* (2013.01); *G06Q 30/0631* (2013.01)

(58) Field of Classification Search
CPC .................................................. G06Q 30/0282
See application file for complete search history.

(56) References Cited

U.S. PATENT DOCUMENTS 4,996,642 A * 2/1991 Hey .................. G06F 16/30
705/26.7
7,571,121 B2 8/2009 Bezos et al.
(Continued)

FOREIGN PATENT DOCUMENTS

WO WO-2008066675 A2 * 6/2008 ......... G06F 17/2785
WO WO-2017013667 A1 * 1/2017 ....... G06F 16/24578
WO WO-2019171306 A1 * 9/2019 ....... G06F 16/24578

OTHER PUBLICATIONS

Ganu et al., "Beyond the Stars: Improving Rating Predictions using Review Text Content", Jun. 28, 2009. Available at: https://people.cs.rutgers.edu/~amelie/papers/2009/WebDB2009.pdf (Year: 2009).*
(Continued)

*Primary Examiner* — David P Sharvin
*Assistant Examiner* — Gregory Harper
(74) *Attorney, Agent, or Firm* — Edell, Shapiro & Finnan, LLC (57) ABSTRACT

A computer system processes reviews to generate personalized recommendations based on a user's preferences. User preferences relating to a subject category are received. A query is processed to retrieve one or more reviews for a plurality of subjects of the subject category, wherein each review is associated with a review score. Each review score of the one or more reviews for each subject is adjusted based on user preferences for a corresponding subject category and a subject score is calculated based on the adjusted review scores for each subject. A ranked list of subjects is generated according to the subject score of each subject. Embodiments of the present invention further include a method and program product for processing reviews to generate personalized recommendations based on a user's preferences in substantially the same manner described above.

18 Claims, 6 Drawing Sheets

(56) References Cited

U.S. PATENT DOCUMENTS

| | | | | |
|---|---|---|---|---|
| 8,166,026 | B1* | 4/2012 | Sadler | G06F 16/951 |
| | | | | 707/732 |
| 8,515,828 | B1* | 8/2013 | Wolf | G06Q 30/02 |
| | | | | 705/26.7 |
| 8,600,796 | B1 | 12/2013 | Sterne et al. | |
| 9,607,325 | B1* | 3/2017 | Sriram | G06Q 30/0282 |
| 9,680,895 | B1* | 6/2017 | Wang | H04L 65/1089 |
| 10,007,936 | B1* | 6/2018 | Ghoshal | G06Q 50/01 |
| 2008/0114608 | A1* | 5/2008 | Bastien | G06Q 10/00 |
| | | | | 705/7.42 |
| 2009/0019268 | A1 | 1/2009 | Matsuzaki et al. | |
| 2009/0144272 | A1* | 6/2009 | Adarsh | G06F 16/90335 |
| | | | | 707/999.005 |
| 2009/0171932 | A1* | 7/2009 | Yahia | G06Q 10/10 |
| 2009/0182568 | A1* | 7/2009 | Cordeiro | G06Q 30/0282 |
| | | | | 705/346 |
| 2009/0192808 | A1* | 7/2009 | Sela | G06Q 30/02 |
| | | | | 705/1.1 |
| 2010/0223249 | A1* | 9/2010 | Steelberg | G06Q 30/0256 |
| | | | | 707/706 |
| 2011/0202400 | A1* | 8/2011 | Bedard | G06Q 30/0251 |
| | | | | 705/14.19 |
| 2012/0290910 | A1 | 11/2012 | Kumar et al. | |
| 2013/0144802 | A1* | 6/2013 | Bank | G06Q 30/02 |
| | | | | 705/347 |
| 2013/0311395 | A1* | 11/2013 | Bohra | G06Q 30/00 |
| | | | | 705/347 |
| 2014/0006298 | A1* | 1/2014 | Pulito | G06Q 30/0282 |
| | | | | 705/319 |
| 2014/0089411 | A1 | 3/2014 | Rubin et al. | |
| 2014/0237453 | A1* | 8/2014 | Hulick, Jr. | G06F 8/70 |
| | | | | 717/127 |
| 2014/0258309 | A1* | 9/2014 | Young | G06F 16/95 |
| | | | | 707/748 |
| 2014/0372338 | A1* | 12/2014 | Kim | G06Q 30/0282 |
| | | | | 705/347 |
| 2015/0066807 | A1* | 3/2015 | Cohen | G06Q 30/0282 |
| | | | | 705/347 |
| 2015/0262264 | A1* | 9/2015 | Appel | G06Q 30/0282 |
| | | | | 705/347 |
| 2016/0063993 | A1* | 3/2016 | Dolan | G06F 40/279 |
| | | | | 704/254 |
| 2016/0086196 | A1* | 3/2016 | Clark | G06F 16/24575 |
| | | | | 705/7.29 |
| 2016/0104216 | A1* | 4/2016 | Turner | G06Q 30/0282 |
| | | | | 705/347 |
| 2016/0171514 | A1* | 6/2016 | Frank | G06Q 50/12 |
| | | | | 705/7.29 |
| 2016/0180437 | A1 | 6/2016 | Boston et al. | |
| 2016/0306801 | A1* | 10/2016 | Andrianakou | G06F 16/285 |
| 2017/0091847 | A1* | 3/2017 | Cama | G06Q 30/0629 |
| 2017/0243172 | A1* | 8/2017 | Dayama | G06Q 10/1095 |
| 2018/0075110 | A1* | 3/2018 | Cho | G06F 16/287 |
| 2018/0267795 | A1* | 9/2018 | Deshpande | G06F 8/70 |
| 2019/0147421 | A1* | 5/2019 | Phillips | H04L 67/2838 |
| | | | | 705/43 |
| 2019/0340537 | A1* | 11/2019 | Fung | G06F 17/18 |
| 2019/0361987 | A1* | 11/2019 | Qiao | G06F 16/335 |

OTHER PUBLICATIONS

Asghar, "Yelp Dataset Challenge: Review Rating Prediction", May 17, 2016. Available at: https://arxiv.org/pdf/1605.05362.pdf (Year: 2016).*

"Natural Language Understanding", https://www.ibm.com/watson/services/natural-language-understanding, retrieved from internet Sep. 2018, 7 pages.

* cited by examiner

PREFERENCE-BASED RE-EVALUATION AND PERSONALIZATION OF REVIEWED SUBJECTS

BACKGROUND

1. Technical Field

Present invention embodiments relate to crowd-sourced reviews, and more specifically, to processing reviews to generate personalized recommendations based on a user's expressed preferences.

2. Discussion of the Related Art

Many web-based services offer crowd-sourced review options where patrons can review goods and services. For example, when an individual purchases a book or dines at a restaurant, the individual may review the book or the dining experience on an online platform for others to read. Potential customers may then browse crowd-sourced reviews in order to make an informed decision when selecting a particular good or service.

When a user reviews a good or service, the reviewer may provide an overall score or rating, the reviewer may provide sub-scores for various aspects of the good or service, and/or the reviewer may write a review detailing the user's experience with the good or service. Since a review may only reflect how closely the good or service was to the reviewer's personal expectations, a particular individual may find some reviews to be more useful or relevant than others.

SUMMARY

According to one embodiment of the present invention, a computer system processes reviews to generate personalized recommendations based on a user's preferences. User preferences relating to a subject category are received. A query is processed to retrieve one or more reviews for a plurality of subjects of the subject category, wherein each review is associated with a review score. Each review score of the one or more reviews for each subject is adjusted based on user preferences for a corresponding subject category and a subject score is calculated based on the adjusted review scores for each subject. A ranked list of subjects is generated according to the subject score of each subject. Embodiments of the present invention further include a method and program product for processing reviews to generate personalized recommendations based on a user's preferences in substantially the same manner described above.

BRIEF DESCRIPTION OF THE DRAWINGS

Generally, like reference numerals in the various figures are utilized to designate like components.

DETAILED DESCRIPTION

Present invention embodiments relate to crowd-sourced reviews, and more specifically, to processing reviews to generate personalized recommendations based on a user's preferences. A review left by one user may not be relevant to another user when the two users do not share the same preferences, opinions, or priorities. For example, when a reviewer creates a review for a good or service, the reviewer may provide a negative overall rating because of a single aspect, such as speed of delivery, that is particularly important to the reviewer. Meanwhile, another user who does not consider speed of delivery to be very important may rely on the poor review without realizing that the item was only rated poorly due to the reviewer's dissatisfaction in the speed of delivery.

Furthermore, a particular aspect of a good or service might be deemed a negative aspect by one person while viewed as a positive aspect by another. For example, a reviewer may provide a product with a negative score because the reviewer does not like a particular aesthetic detail of the product. This may lead another user to miss out on the product due to its low score, despite the fact that the other user would have enjoyed the product even with the aesthetic detail that the reviewer disfavored. Moreover, aspects that are unrelated to a good or service, such as a particular brand or advertising campaign, may influence reviewers. When reviews that a user would find irrelevant are weighted the same as relevant reviews, rankings can be skewed, making it more difficult for a user to select a good or service.

Some review platforms provide separate scores for a number of aspects, such as quality of service, accessibility of a location, durability of a product, and the like. While a fine-grained approach to reviewing may be more helpful than a singular score, a fixed set of aspects cannot always account for the variety of specific user preferences. Present invention embodiments process crowd-sourced reviews to create personalized recommendations for a user based on the user's specific requirements and interests. The target of each review may include any reviewable subject in a subject category, such as a particular good or service. For example, a subject category might include vehicles, and subjects within that category may include particular makes and models of vehicles. Using natural language processing, reviews can be analyzed, and the scores of each reviewed subject can be re-evaluated in light of the particular features and aspects of the subject that are sought by a user. For each category of subjects, a user may provide requirements, which are features that must be satisfied, and interests, which are features that a user would like to see in a given subject. First, a user may be prompted to specify a category of subjects, and then, the user may specify his or her preferences, including requirements and interests, relating to subjects that fall within the selected category. Reviews of subjects may then be processed to eliminate any subjects that do not comply with a user's requirements for the subject category, and the remaining subjects can be ranked according to the user's interests.

It should be noted that references throughout this specification to features, advantages, or similar language herein do not imply that all of the features and advantages that may be realized with the embodiments disclosed herein should be, or are in, any single embodiment of the invention. Rather, language referring to the features and advantages is understood to mean that a specific feature, advantage, or characteristic described in connection with an embodiment is included in at least one embodiment of the present invention. Thus, discussion of the features, advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages will become more fully apparent from the following drawings, description and appended claims, or may be learned by the practice of embodiments of the invention as set forth hereinafter.

Figure 1:
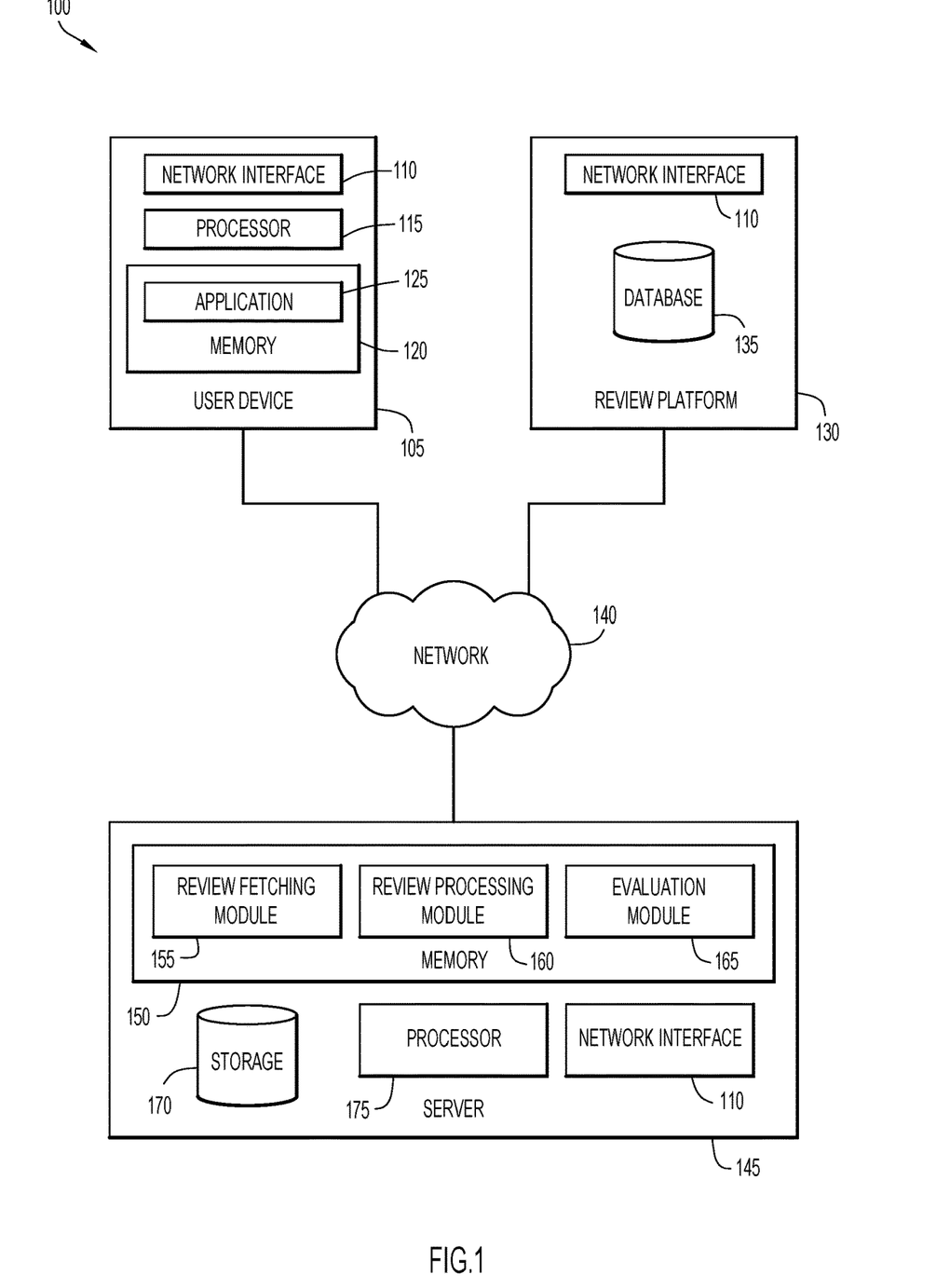
FIG. 1 is a block diagram depicting a computing environment for processing reviewed subjects in accordance with an embodiment of the present invention.

Present invention embodiments will now be described in detail with reference to the Figures. FIG. 1 is a block diagram depicting a computing environment 100 for processing reviewed subjects in accordance with an embodiment of the present invention. As depicted, computing environment 100 includes a user device 105, a review platform 130, a network 140, and a server 145. It is to be understood that the functional division among components of computing environment 100 have been chosen for purposes of explaining the present invention embodiments and is not to be construed as a limiting example.

User device 105 includes a network interface 110, a processor 115, and memory 120 with application 125. In various embodiments of the present invention, user device 105 may include a laptop computer, a tablet computer, a netbook computer, a personal computer (PC), a desktop computer, a personal digital assistant (PDA), a smart phone, a thin client, or any programmable electronic device capable of executing computer readable program instructions. User device 105 may include internal and external hardware components, as depicted and described in further detail with respect to FIG. 6.

Application 125 may include one or more modules or units to perform various functions of present invention embodiments described below. Application 125 may be implemented by any combination of any quantity of software and/or hardware modules or units, and may reside within memory 120 of user device 105 for execution by a processor, such as processor 115.

Application 125 may enable a user of user device 105 to access review platforms, such as review platform 130, to read reviews of subjects including goods and services. A user may provide a query that includes a particular category of subjects (e.g., goods or services) to application 125, which fetches subjects and their corresponding reviews according to the query. Application 125 may also enable user device 105 to communicate with server 145 in order to provide a user with personalized reviews based on the user's requirements and interests for a given subject category, which the user can input into application 125. A user may define each requirement or interest by providing a concept of the requirement or interest as well as the user's attitude toward the concept. For example, a concept may include "dogs admitted," "premium cuts of meat offered," or "contemporary decor," and the attitude may express whether the user finds the concept to be favorable or disagreeable. Thus, application 125 may present to a user of user device 105 a result set of subjects corresponding to a given query, where the result set includes subjects that are ranked according to the user's personal preferences.

Review platform 130 includes a network interface 110 and a database 135. Review platform 130 may host crowd-sourced reviews for a variety of subjects. Users may access review platform 130 to read reviews for a given subject, or to provide their review of a subject. In some embodiments, review platform 130 includes a website that features the ability for users to review subjects. Review platform 130 may include a forum that is specifically directed toward the reviewing of subjects, or review platform 130 may include an e-commerce website that provides users with the ability to review goods or services that are being offered for sale.

Database 135 may include any non-volatile storage media known in the art. For example, database 135 can be implemented with a tape library, optical library, one or more independent hard disk drives, or multiple hard disk drives in a redundant array of independent disks (RAID). Similarly, data on database 135 may conform to any suitable storage architecture known in the art, such as a file, a relational database, an object-oriented database, and/or one or more tables. Storage 135 may store crowd-sourced reviews of subjects, vendor-provided descriptions of subjects, and other details of subjects, such as pricing, hours of service, presence or absence of features, and the like. Thus, a query can be executed against database 135 to provide a result set of subjects that match the query, along with reviews of those subjects.

Server 145 includes a network interface 110, a processor 175, memory 150, and storage 170. Memory 150 may include a review fetching module 155, a review processing module 160, and an evaluation module 165. In general, server 145 processes third-party reviews of subjects according to a user's requirements and interests to generate a personalized set of recommendations for the user. In various embodiments of the present invention, server 145 may include a laptop computer, a tablet computer, a netbook computer, a personal computer (PC), a desktop computer, a personal digital assistant (PDA), a smart phone, a thin client, or any programmable electronic device capable of executing computer readable program instructions. Server 145 may include internal and external hardware components, as depicted and described in further detail with respect to FIG. 6.

Review fetching module 155, review processing module 160, and evaluation module 165 may include one or more modules or units to perform various functions of present invention embodiments described below. Review fetching module 155, review processing module 160, and evaluation module 165 may be implemented by any combination of any quantity of software and/or hardware modules or units, and may reside within memory 150 of server 145 for execution by a processor, such as processor 175.

Review fetching module 155 may search network-accessible locations to fetch reviews of subjects that correspond to a user's query. For example, if a user searches for a subject category such as "restaurants," then review fetching module 155 may find reviews of restaurants within a particular user-defined area. In some embodiments, review fetching module 155 also fetches a vendor-provided description of a subject, such as a restauranteur's own description of their restaurant, a manufacturer's specifications of a good, a salon owner's description of the services offered, and the like. Review fetching module 155 may fetch third-party reviews and/or vendor-provided descriptions from one or more databases, such as database 135 of review platform 130. In some embodiments, review fetching module 155 accesses information from one or more proprietary services using an application programming interface (API) of the proprietary service.

Review processing module 160 analyzes reviews to determine whether a review discusses concepts that a user has identified as a requirement or an interest, and if so, determines the review's attitude (e.g., positive or negative) toward the concept. Review processing module 160 may determine that a review contains information relating to a user's requirements or interests by detecting the presence of certain words and/or phrases that are associated with the requirements or interests provided by the user. In addition to analyzing reviews, review processing module 160 may also consider the vendor-provided descriptions of subjects. In some embodiments, review processing module 160 determines that a review contains information relevant to a user's requirements and/or interests using conventional or other natural language processing techniques. Review processing module 160 may then use conventional or other natural language processing techniques to ascertain a review's attitude toward the identified requirement or interest by determining the tone and treatment of the language used by the review author in discussing the requirement or interest. In some embodiments, review processing module 160 uses natural language processing to determine the tone of each review. Linguistic analysis can determine tones in a review like frustration, satisfaction, displeasure, excitement, and the like. Review processing module 160 may employ conventional or other machine learning techniques in conjunction with natural language processing in order to more accurately determine when reviews discuss concepts and furthermore, the attitudes of reviews.

As an example, if a user requirement specifies that venues must be dog-friendly, review processing module 160 may determine which reviews are relevant (e.g., by the presence of words such as "dog," "pet," "animal," and the like). Review processing module 160 may then apply natural language processing to determine whether the relevant reviews indicate whether dogs are allowed at the venue. For example, review processing module 160 may determine that a particular venue allows dogs according to a negative review that complains about dogs at the venue, or a positive review that discusses how the author's dog was allowed on the property.

Evaluation module 165 calculates new scores for reviewed subjects according to the results of the analysis of review processing module 160 in light of a user's requirements and interests. For example, if a user interest indicates that the user prefers restaurants that have spicy cuisine options on their menu, then evaluation module 165 may convert a negative review that complains about an overly-spicy dish into a positive review for that restaurant. Evaluation module 165 may filter out any subjects that do not meet the user's requirements. For example, if a user stipulates that a restaurant menu must contain a vegetarian option, any restaurants that do not offer a vegetarian option (e.g., as determined by review processing module 160) may be omitted from the results that are presented to the user. After evaluation module 165 calculates scores for reviews based on their relevance to a user's requirements and interests and the similarity of their attitude to the user's attitude for a given requirement or interest, evaluation module 165 uses the new review scores to evaluate and re-rank the subjects that are presented to a user. Thus, evaluation module 165 generates a list of reviewed subjects that are ranked in order of a user's personal preferences, enabling a user to quickly peruse goods and services that are most relevant to the user.

Storage 170 may include any non-volatile storage media known in the art. For example, storage 170 can be implemented with a tape library, optical library, one or more independent hard disk drives, or multiple hard disk drives in a redundant array of independent disks (RAID). Similarly, data on storage 170 may conform to any suitable storage architecture known in the art, such as a file, a relational database, an object-oriented database, and/or one or more tables. Storage 170 may store a user's requirements and interests for one or more categories of subjects. For example, storage 170 may store a user's requirements and interests for any subject that can be reviewed, such as restaurants, day spas, electronic devices, fashion, and the like.

Network 140 may include, for example, a local area network (LAN), a wide area network (WAN) such as the Internet, or a combination of the two, and may include wired, wireless, or fiber optic connections. In general, network 140 can be any combination of connections and protocols that will support communications between user device 105, review platform 130, and server 145 (via their respective network interfaces 110) in accordance with an embodiment of the present invention.

Figure 2:
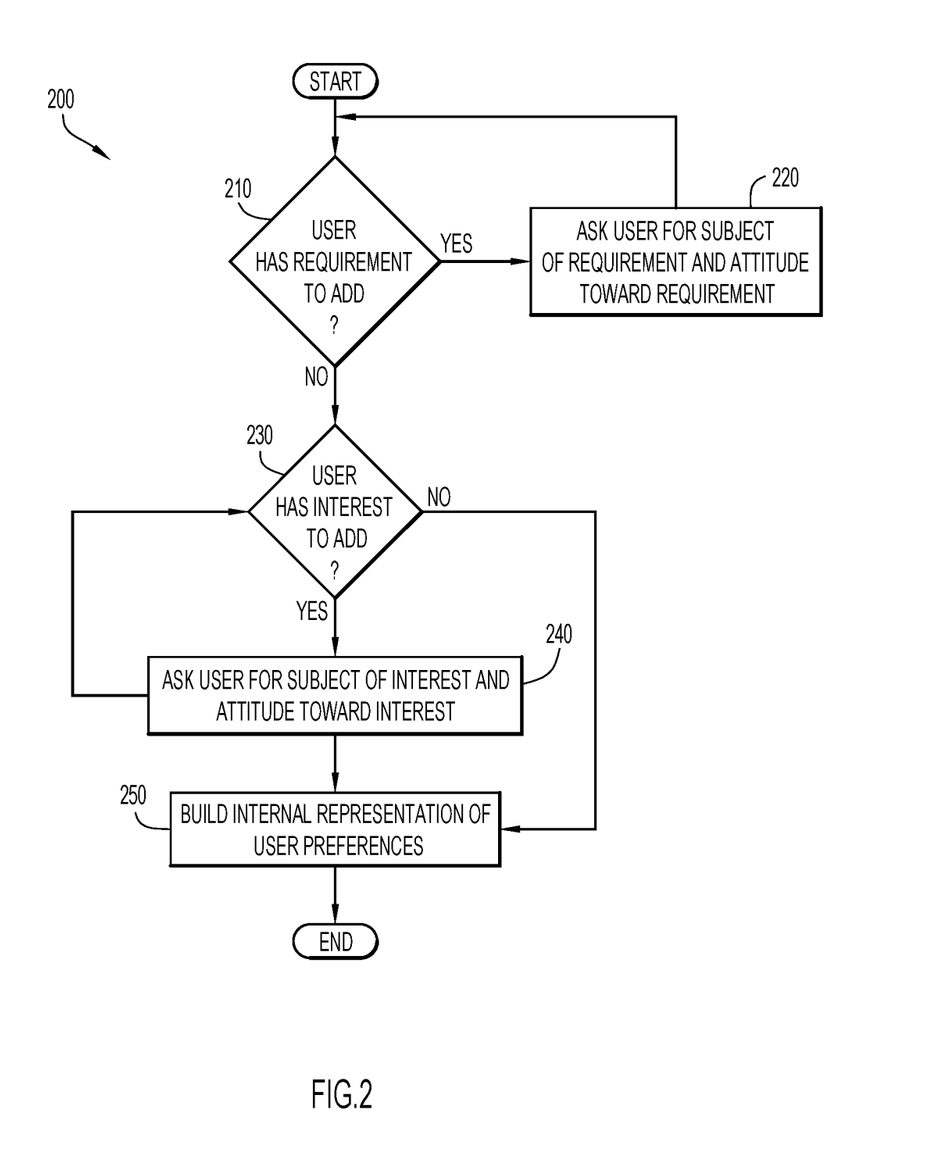
FIG. 2 is a flow chart depicting a method of receiving preferences of a user in accordance with an embodiment of the present invention.

FIG. 2 is a flow chart depicting a method 200 of receiving preferences of a user in accordance with an embodiment of the present invention.

Operation 210 determines whether a user has a requirement to add. In some embodiments, a user of user device 105 may be prompted to determine if the user has any requirements to add. If the user has a requirement to add, then the user may add the requirement at operation 220.

A user is asked to provide the subject of the requirement and the user's attitude toward the requirement at operation 220. A user may specify the user's requirements and interests using application 125 of user device 105. A requirement may include any feature that a user requires a subject to have, and the user's attitude toward the requirement may be expressed in terms of a positive attitude (e.g., "must have") or a negative attitude (e.g., "must not have"). For example, if the category for a subject is cars, the user may require that the cars be a particular color, such as red. Method 200 may iterate through operations 210 and 220 several times, enabling a user to further refine the user's requirements for a given category of subjects. For example, a user may specify that the user requires cars to be red, four-door sedans that have been driven for less than 50,000 miles.

When a user has no more requirements to specify, operation 230 determines whether the user has an interest to add. In some embodiments, a user of user device 105 may be prompted to determine if the user has any interests to add. Interests may include any features that a user prefers that are desired, but not necessarily required.

If the user has an interest to add, the user is asked to provide the subject of the interest and the user's attitude toward the interest at operation 240. When the user adds an interest, the user may also specify the user's attitude (e.g., positive or negative) toward the interest. For example, the user may specify that the user is interested in cars that achieve, on average highway usage, fuel efficiency of twenty miles per gallon or greater. A user may also specify interests that are subjective in nature, since reviewers may often leave reviews that express subjective preferences. For example, user interests can include "cars that handle well," "cars with engines that sound nice," or "cars with interesting paint patterns." Thus, a user's interests can be considered alongside the user's requirements, enabling a user to filter out subjects in which the user is not interested, while sorting other subjects according to the degree to which an item matches the user's interests.

Once the user's interests are added, an internal representation of the user's preferences is built at operation 250. The internal representation may include a listing of all of the requirements and/or interests that have been provided by the user for a given category of subjects. Thus, a user's preferences may be collected without requiring the use or analysis of a user or reviewer profile, or the use of any externally-gathered personal information relating to the user.

Figure 3:
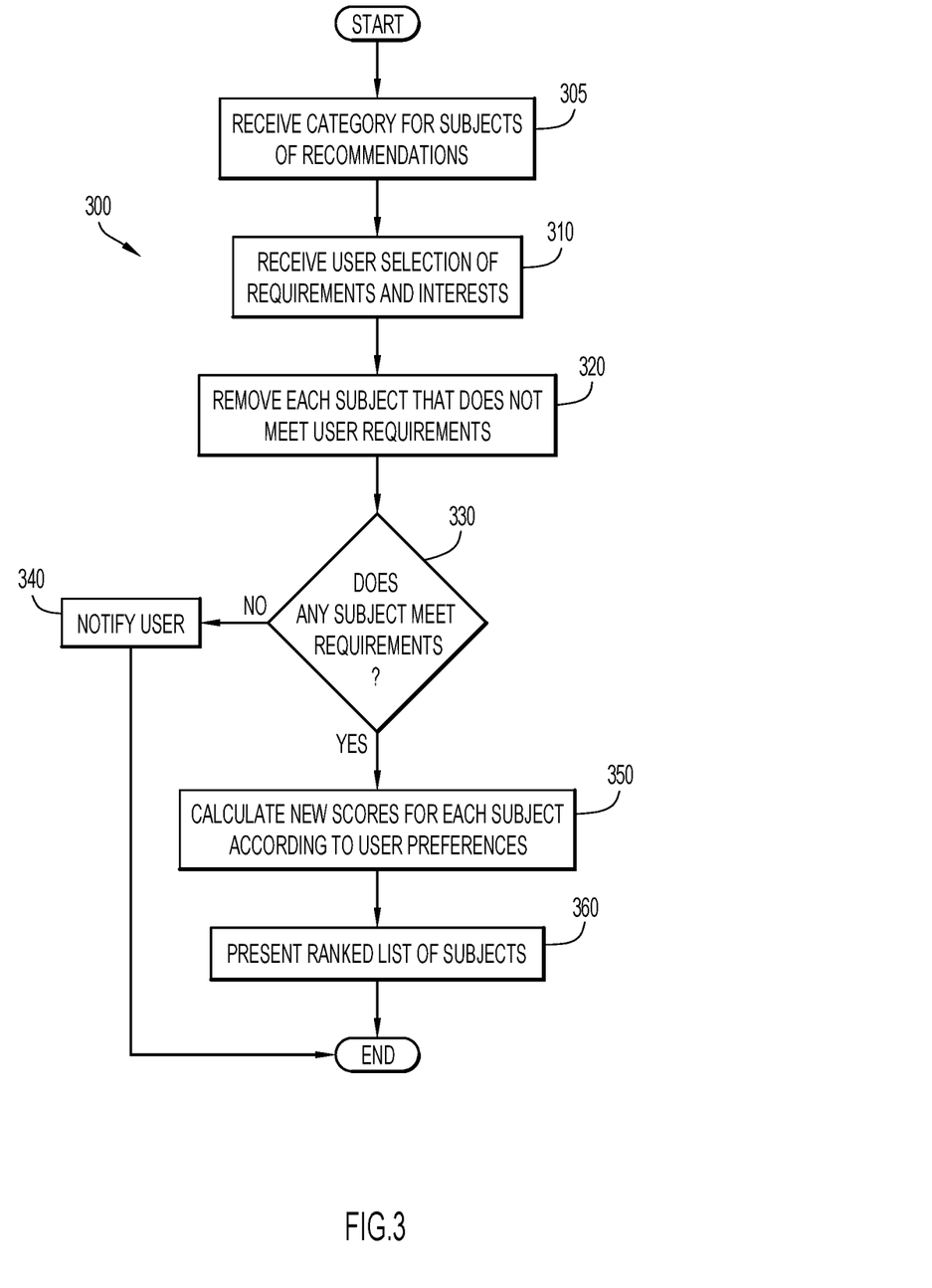
FIG. 3 is a flow chart depicting a method of re-evaluating reviews in accordance with an embodiment of the present invention.

FIG. 3 is a flow chart depicting a method 300 of re-evaluating reviews in accordance with an embodiment of the present invention.

A category for the subjects of recommendations is received at operation 305. A user may provide a subject category for which reviews may be fetched. For example, a user may input a subject category of "restaurants," "cars," "films," and the like. The subject category that a user provides may thus define the scope of the review search.

A user selection of requirements and interests is received at operation 310. A user may specify the user's requirements and interests using application 125 of user device 105. A requirement may include any feature that a user requires a subject to have, whereas an interest may include any feature that a user would like to see in a subject. A user may submit requirements and interests for each category of subject. For example, since a user's requirements and interests for a dining experience would differ from the user's requirements and interests for sportswear items, each category of subject (e.g., each type of good or service) may require a user to submit a different set of requirements and interests. Application 125 may prompt a user to indicate a concept, along with a few words describing the concept, the user's attitude toward the concept, and whether the concept is a requirement or an interest.

Each subject that does not meet a user's requirements is removed at operation 320 (which is described in greater detail with reference to FIG. 4). The subjects under consideration may include a list of all subjects that are relevant for a query. In some embodiments, a user query is submitted to application 125 of user device 105, which searches one or more databases, such as database 135 of review platform 130, for subjects that match the query. A subject may be removed if the subject fails to provide a feature that the user stipulates as a requirement, or if the subject has a feature that conflicts with a user requirement. Thus, present invention embodiments process a query by first fetching subjects related to the query, and then using natural language processing to further refine the result set according to the user's specific requirements. For example, if a user requirement for gyms is that a gym must have a pool, then any gym lacking a pool will be removed. Similarly, if a user requirement is that a gym must not play music, then any gym that plays music will be removed. Whether a subject meets a user requirement or not may be determined according to review processing module 160. In some embodiments, a subject may also be removed when the subject's average of adjusted review scores fails to meet a predetermined threshold.

Operation 330 determines whether any subject meets a user's requirements. If no subjects meet the user's requirements, the user is notified that there are no subjects for the user's query that meet the user's requirements at operation 340.

If at least one subject satisfies the user's requirements, new scores are calculated for each subject according to a user's preferences at operation 350 (which is described in more detail with reference to FIG. 5). Evaluation module 165 may evaluate reviews of subjects to provide a score for each subject that takes into account the user's interests. In general, subjects that meet more of a user's interests may be scored more favorably than subjects that meet fewer or none of the user's interests.

The ranked list of subjects is ranked according to the new scores and presented to the user at operation 360. By ranking the list of subjects according to the scores provided by evaluation module 165, the subjects may be presented in an order that is ranked according to the user's preferences. In some embodiments, evaluation module 165 provides the new score of each subject to application 125, which sorts the subjects according to their scores and presents the ranked list to a user of user device 105.

Figure 4:
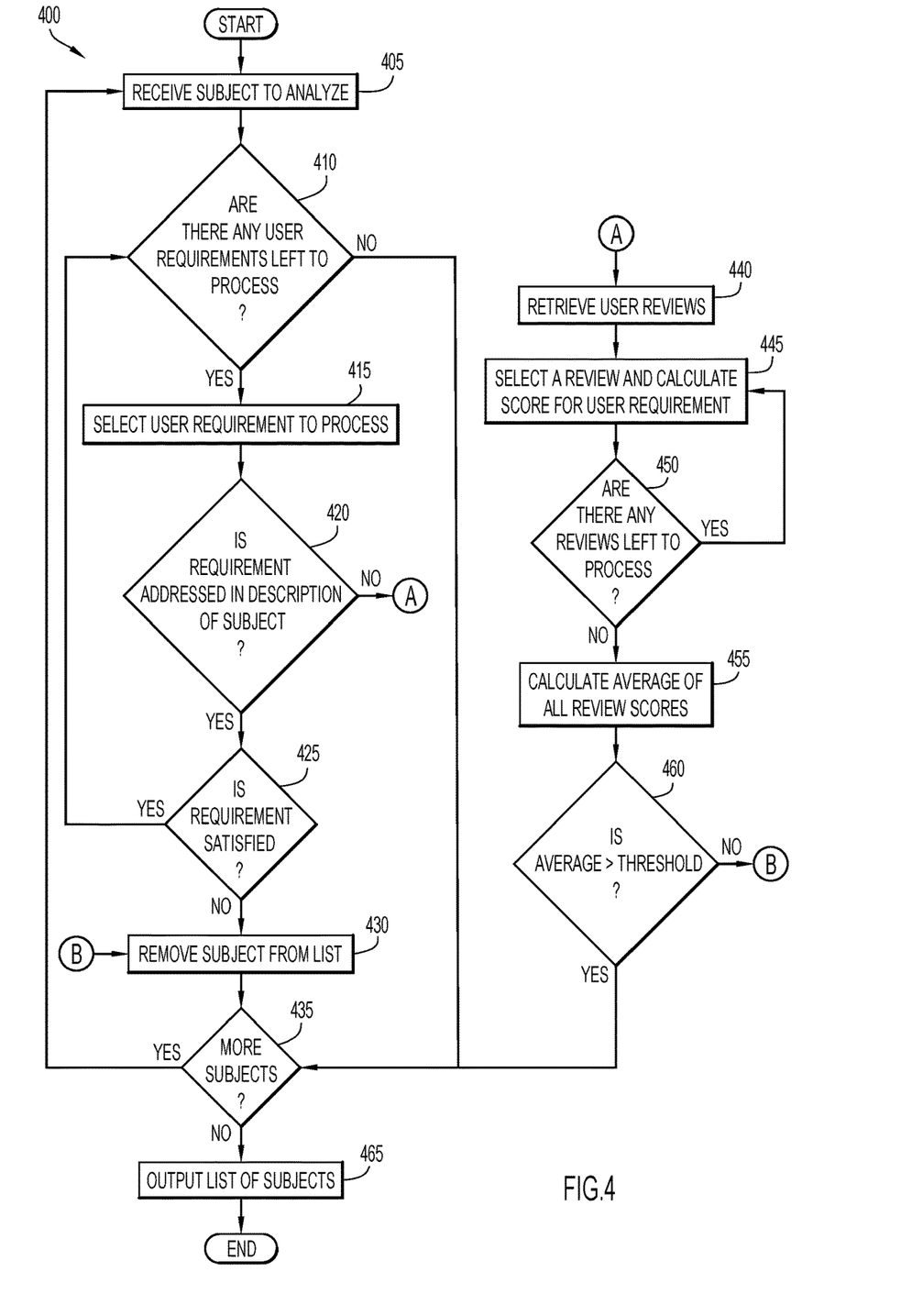
FIG. 4 is a flow chart depicting a method of re-evaluating reviews based on a user's requirements in accordance with an embodiment of the present invention.

FIG. 4 is a flow chart depicting a method 400 of re-evaluating reviews based on a user's requirements in accordance with an embodiment of the present invention.

A subject is received for analysis at operation 405. The subject may be selected from a list of subjects from a result set of a user query. In general, method 400 processes each subject individually to determine whether the subject should be discarded for failure to meet a user requirement.

Operation 410 determines whether there are any remaining user requirements to process for the selected subject. If there is at least one user requirement that has not yet been processed, a user requirement is selected for processing at operation 415. If all of a user's requirements have been processed, method 400 proceeds to operation 435.

Operation 420 determines whether the user requirement is addressed in the vendor-provided description of the subject. Review processing module 160 may use conventional or other natural language processing techniques to determine whether the vendor-provided description addresses the currently-selected user requirement. If the vendor-provided description does address the user requirement, operation 425 determines whether the user requirement is satisfied. Review processing module 160 may apply natural language processing techniques to determine if, based on the vendor-provided description, the user requirement is fulfilled or not. For example, if the vendor-provided description of a hotel contains a field that states "Wi-Fi: no," and the user stipulated that their hotel must provide Wi-Fi, then review processing module 160 will determine that the user requirement is not satisfied. If a subject does not satisfy the currently-selected user requirement, then the subject is removed from the list of subjects being considered at operation 430. If the user requirement is satisfied by the subject, method 400 returns to operation 410 to begin processing the next user requirement.

When all of the user's requirements are processed as determined at operation 410, operation 435 determines whether there are any more subjects to process. If any subjects remain, then method 400 returns to operation 405.

If a vendor-provided description fails to address a user requirement as determined at operation 420, then user reviews may instead be processed to determine if any reviews discuss the user requirement. Operation 440 retrieves user reviews of a subject. The reviews may be retrieved by review fetching module 155 and analyzed by review processing module 160 using natural language processing techniques.

A review is selected and a score is calculated based on a user requirement at operation 445. Review processing module 160 may calculate a relevance score for each review, which indicates how much a review focuses on the subject of the user requirement. Review processing module 160 may also calculate an attitude score for each review, which indicates how well the review's discussion of the user requirement matches the user's attitude toward the requirement. For example, if a user requirement requires that a restaurant serve ice cream, then any reviews that indicate that ice cream is available will receive both a high relevance score and attitude score. Similarly, if a review does not mention ice cream at all, then the review will receive a low relevance score, and if a review mentions ice cream but indicates that ice cream is not available, the review would receive a high relevance score and a low attitude score. Once the relevance and attitude scores are calculated, an adjusted score for a review may be calculated based on a weighting of the relevance score, the attitude score, and the old review score (e.g., the score as originally provided by the reviewer). The adjusted score may be calculated according to the formula adjusted_score=mean (old_score*f1, relevance score*f2, attitude_score*f3), where old_score represents the original review score (e.g., a reviewer-provided score), relevance score represents how relevant the review is to the concept provided by the user, attitude_score represents how similar the attitude of the review is to the user's attitude toward the concept, and f1, f2, and f3 are adjustable weights between 0 and 1. The reviewer's attitude score can be determined according to a language study of the reviewer's review, which can be processed via review processing module 160. For example, review processing module 160 may determine whether, based on the language a reviewer uses in a review, the reviewer's attitude (e.g., positive or negative) toward various aspects of subject. The adjusted score may be normalized in order to match the same range as the original review scores. To normalize the adjusted scores, a normalize function is applied to each score using the lowest and highest possible scores for a review as the lower and upper bounds, respectively.

Operation 450 determines whether there are any remaining reviews to process. If there are more reviews to process, method 400 returns to operation 445. When there are no more reviews to process, an average of all review scores for the subject is calculated at operation 455.

Operation 460 determines whether the calculated average for a subject is greater than a pre-determined threshold. If the average exceeds the threshold, then the subject may remain on the list of subjects; however, if the average does not exceed the threshold, then the subject is removed from the list of subjects being considered. Thus, failure to exceed the threshold indicates that the subject's reviews had low relevance scores, attitude scores, and/or old review scores.

A list of subjects is output at operation 465. The list may reflect a pool of subjects that meet the user's search criteria and satisfy all of the user's requirements. In some embodiments, the list of subjects is processed by evaluation module 165 according to method 500, which further personalizes the subjects that will be presented to a user by ranking the subjects according to the user's interests.

Figure 5:
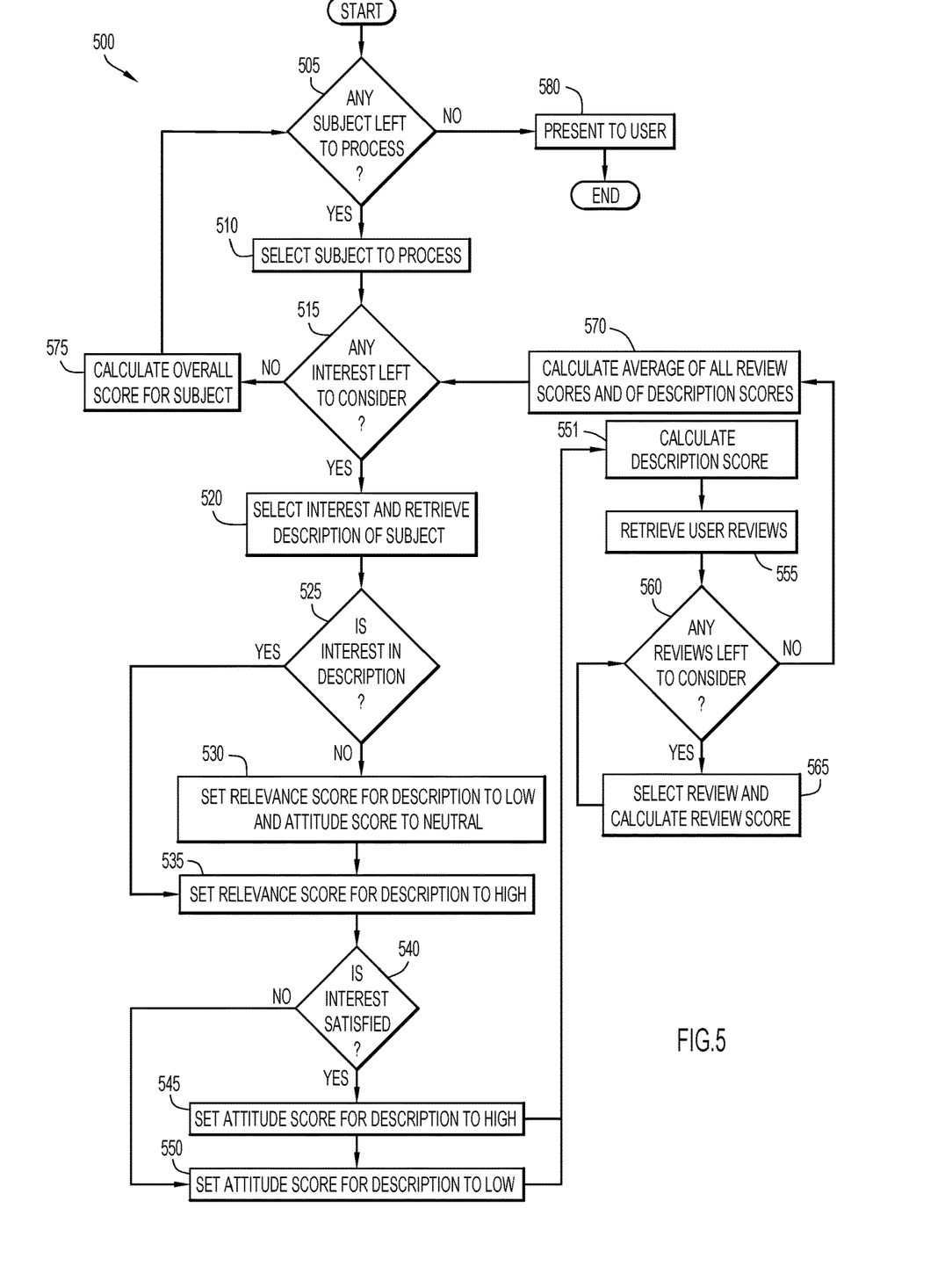
FIG. 5 is a flow chart depicting a method of re-evaluating reviews based on a user's interests in accordance with an embodiment of the present invention.

FIG. 5 is a flow chart depicting a method 500 of re-evaluating reviews based on a user's interests in accordance with an embodiment of the present invention. In some embodiments, method 500 is performed on a list of subjects that has been previously processed by method 400 in order to remove any subjects that do not comply with a user's requirements and/or have scores below a threshold.

Operation 505 determines whether there are any remaining subjects to process. If any subjects have not yet been processed, then a subject is selected for processing at operation 510.

Operation 515 determines whether there are any user interests left to consider. If any user interests have not yet been considered, then a user interest is selected and a vendor-provided description of the subject is retrieved at operation 520. The description of the subject may be retrieved by review fetching module 155.

Operation 525 determines whether the user interest is referenced in the description. Review processing module 160 may use conventional or other natural language processing techniques to determine whether the vendor-provided description addresses the currently-selected user interest. If the vendor-provided description does address the user interest, the relevance score for the description is set to high at operation 535. Operation 540 then determines whether the user interest is satisfied by the vendor-provided description. Review processing module 160 may apply natural language processing techniques to determine if, based on the vendor-provided description, the user interest is satisfied or not. If the user interest is fulfilled, then the description's attitude score is set to high at operation 545. Alternatively, if the user interest is not fulfilled, then the description's attitude score is set to low at operation 550.

If a user interest is not addressed in the vendor-provided description of the subject as determined at operation 525, the relevance score of the description is set to low, and the attitude score of the description is set to neutral at operation 530. Once the vendor-provided description has been analyzed to assign a relevance score and attitude score to a subject, the subject's score is re-evaluated in light of crowd-sourced reviews and the user's preferences. First, a description score is calculated at operation 551. The description score may be calculated by combining the relevance score and the attitude score of the description. User reviews are retrieved at operation 555. User reviews may be retrieved by review fetching module 155.

Operation 560 determines whether there are any remaining reviews to consider. When there are reviews remaining, a review is selected and a new score is calculated for the review at operation 565. Review processing module 160 may calculate a relevance score for the review, which indicates how much the review focuses on the user interest, and an attitude score for the review, which indicates how well the review's discussion of the interest conforms with the user's attitude toward the interest. Review processing module 160 may use conventional or other natural language processing techniques in determining the relevance score and attitude score for a review. Once the relevance and attitude scores are calculated, operation 565 generates an adjusted score for a review by weighting the relevance score, attitude score, and the old review score (e.g., the subject's score as originally scored by the reviewer). The adjusted score may be calculated according to the formula adjusted_score=mean (old_score*f1, relevance score*f2, attitude_score*f3), where old_score represents the original review score (e.g., a reviewer-provided score), relevance score represents how relevant the review is to the concept provided by the user, attitude_score represents how similar the attitude of the review is to the user's attitude toward the concept, and f1, f2, and f3 are adjustable weights between 0 and 1. The adjusted score may be normalized in order to match the same range as the original review scores. To normalize the adjusted scores, a normalize function is applied to each score using the lowest and highest possible scores for a review as the lower and upper bounds, respectively.

Once there are no remaining reviews to process, the average of the description score and adjusted review scores for a given interest for a subject is calculated at operation 570. The average of the description score and adjusted review scores may be a weighted average. Once all of the user interests have been processed, an overall score is calculated for the selected subject at operation 575. The overall score for the subject may be based on the average scores that were generated at operation 570.

Once there are no more remaining subjects to process, the results are presented to the user at operation 580. The resulting list of subjects may be ranked according to the overall scores of each subject, thus reflecting how well each subject satisfies a user's interests. The resulting list may be presented to a user via application 125 of user device 105.

Figure 6:
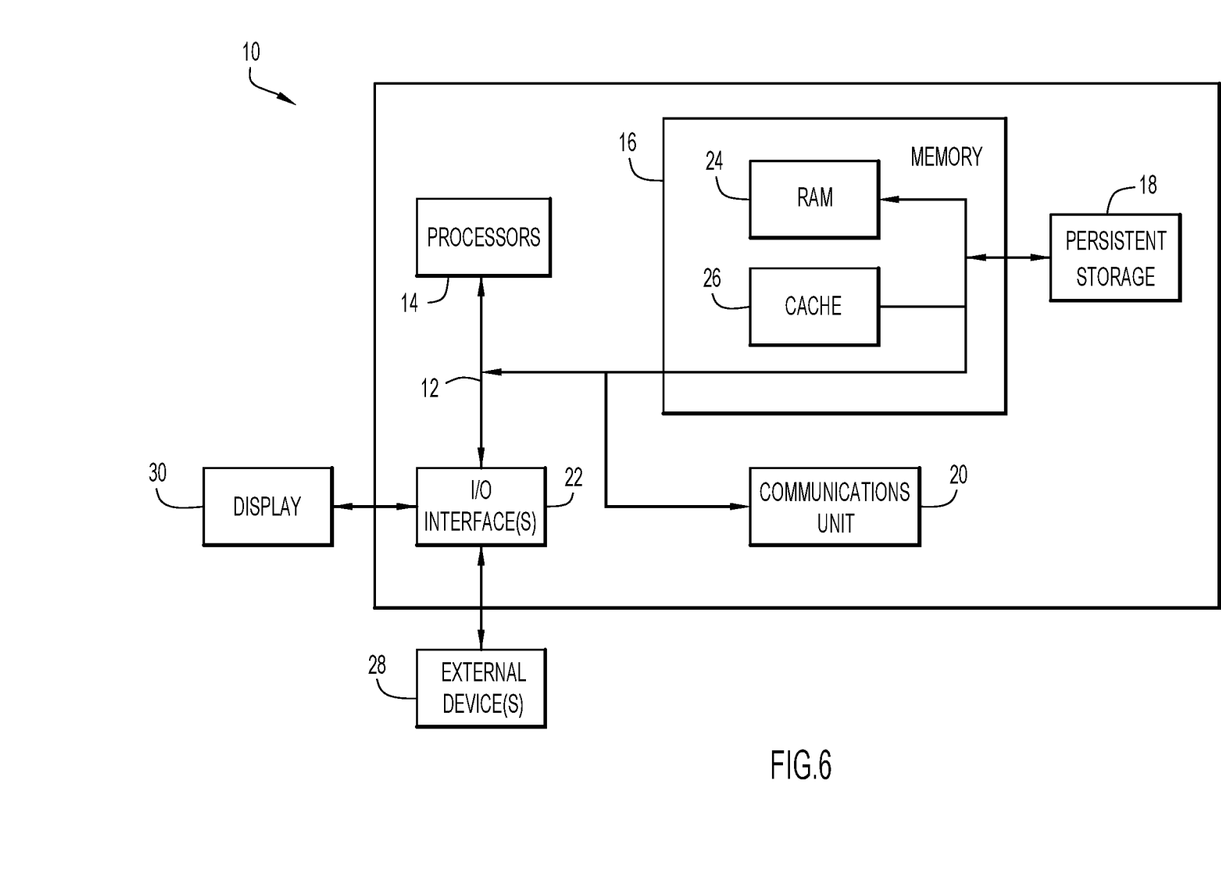
FIG. 6 is a block diagram depicting a computing device in accordance with an embodiment of the present invention.

FIG. 6 is a block diagram depicting components of a computer 10 suitable for executing the methods disclosed herein. Computer 10 may enable user device 105, review platform 130, and server 145 to process reviews to generate personalized recommendations based on a user's preferences in accordance with embodiments of the present invention. It should be appreciated that FIG. 6 provides only an illustration of one embodiment and does not imply any limitations with regard to the environments in which different embodiments may be implemented. Many modifications to the depicted environment may be made.

As depicted, the computer 10 includes communications fabric 12, which provides communications between computer processor(s) 14, memory 16, persistent storage 18, communications unit 20, and input/output (I/O) interface(s) 22. Communications fabric 12 can be implemented with any architecture designed for passing data and/or control information between processors (such as microprocessors, communications and network processors, etc.), system memory, peripheral devices, and any other hardware components within a system. For example, communications fabric 12 can be implemented with one or more buses.

Memory 16 and persistent storage 18 are computer readable storage media. In the depicted embodiment, memory 16 includes random access memory (RAM) 24 and cache memory 26. In general, memory 16 can include any suitable volatile or non-volatile computer readable storage media.

One or more programs may be stored in persistent storage 18 for execution by one or more of the respective computer processors 14 via one or more memories of memory 16. The persistent storage 18 may be a magnetic hard disk drive, a solid state hard drive, a semiconductor storage device, read-only memory (ROM), erasable programmable read-only memory (EPROM), flash memory, or any other computer readable storage media that is capable of storing program instructions or digital information.

The media used by persistent storage 18 may also be removable. For example, a removable hard drive may be used for persistent storage 18. Other examples include optical and magnetic disks, thumb drives, and smart cards that are inserted into a drive for transfer onto another computer readable storage medium that is also part of persistent storage 18.

Communications unit 20, in these examples, provides for communications with other data processing systems or devices. In these examples, communications unit 20 includes one or more network interface cards. Communications unit 20 may provide communications through the use of either or both physical and wireless communications links.

I/O interface(s) 22 allows for input and output of data with other devices that may be connected to computer 10. For example, I/O interface 22 may provide a connection to external devices 28 such as a keyboard, keypad, a touch screen, and/or some other suitable input device. External devices 28 can also include portable computer readable storage media such as, for example, thumb drives, portable optical or magnetic disks, and memory cards.

Software and data used to practice embodiments of the present invention can be stored on such portable computer readable storage media and can be loaded onto persistent storage 18 via I/O interface(s) 22. I/O interface(s) 22 may also connect to a display 30. Display 30 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Data relating to processing reviewed subjects may be stored within any conventional or other data structures (e.g., files, arrays, lists, stacks, queues, records, etc.) and may be stored in any desired storage unit (e.g., database, data or other repositories, queue, etc.) The data transmitted between user device 105, review platform 130, and server 145 may include any desired format and arrangement, and may include any quantity of any types of fields of any size to store the data. The definition and data model for any data relating to processing reviewed subjects may indicate the overall structure in any desired fashion (e.g., computer-related languages, graphical representation, listing, etc.).

Data relating to processing reviewed subjects, such as review data, vendor-provided data, user preference data, and program instructions for processing reviews (including any natural language processing instructions), may include any information provided to user device 105, review platform 130, and/or server 145. Data relating to processing reviewed subjects may include any desired format and arrangement, and may include any quantity of any types of fields of any size to store any desired data. The fields may indicate the presence, absence, actual values, or any other desired characteristics of the data of interest (e.g., quantity, value ranges, etc.). Data relating to processing reviewed subjects may include all or any desired portion (e.g., any quantity of specific fields) of any data of interest within a given implementation or system. Data relating to processing reviewed subjects may indicate the overall structure in any desired fashion (e.g., computer-related languages, graphical representation, listing, etc.).

Data relating to processing reviewed subjects may include any data, such as data that is made available over time, or an amount of data that is available immediately. A computing environment for processing reviewed subjects may perform any operation on any data that it processes. A computing environment for processing reviewed subjects may utilize any number natural language processing techniques (or combinations thereof) for processing reviews and descriptions of subjects.

The present invention embodiments may employ any number of any type of user interface (e.g., Graphical User Interface (GUI), command-line, prompt, etc.) for obtaining or providing information (e.g., user requirements and interests), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

It will be appreciated that the embodiments described above and illustrated in the drawings represent only a few of the many ways of implementing embodiments for processing reviews to generate personalized recommendations based on a user's preferences.

The computing environment of present invention embodiments may include any number of computer or other processing systems (e.g., client or end-user systems, server systems, nodes, etc.) and databases or other repositories arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., desktop, laptop, PDA, mobile devices, etc.), and may include any commercially-available operating system and any combination of commercially available and custom software (e.g., communications software, server software, natural language processing software, application 125, review fetching module 155, review processing module 160, evaluation module 165, etc.). These systems may include any types of monitors and input devices (e.g., keyboard, mouse, voice recognition, etc.) to enter and/or view information.

It is to be understood that the software (e.g., communications software, server software, natural language processing software, application 125, review fetching module 155, review processing module 160, evaluation module 165, etc.) of the present invention embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present invention embodiments (e.g., communications software, server software, natural language processing software, application 125, review fetching module 155, review processing module 160, evaluation module 165, etc.) may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information (e.g., subject reviews, vendor-provided descriptions, user requirements and interests, etc.). The database system may be implemented by any number of any conventional or other databases, data stores or storage structures (e.g., files, databases, data structures, data or other repositories, etc.) to store information (e.g., subject reviews, vendor-provided descriptions, user requirements and interests, etc.). The database system may be included within or coupled to the server and/or client systems. The database systems and/or storage structures may be remote from or local to the computer or other processing systems, and may store any desired data (e.g., subject reviews, vendor-provided descriptions, user requirements and interests, etc.).

The present invention embodiments may employ any number of any type of user interface (e.g., Graphical User Interface (GUI), command-line, prompt, etc.) for obtaining or providing information (e.g., any data provided to and/or generated by a computing environment for processing reviewed subjects), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A computer-implemented method of processing reviews to generate personalized recommendations based on a user's preferences, the method comprising:
   receiving user preferences relating to a subject category;
   processing a query, wherein in response to processing the query, one or more reviews for a plurality of subjects of the subject category are retrieved, wherein each review is associated with a review score;
   adjusting each review score of the one or more reviews for each subject by modifying a value of the review score based on user preferences for a corresponding subject category, including a relevance score indicating a relevance of the subject of each review to the user preferences, and based on an attitude score indicating a similarity of an attitude of each review to a user's attitude toward the subject of the review, and wherein adjusting each review score of the one or more reviews further comprises increasing a review score when a reviewer's attitude toward the subject of the review is negative and the user's attitude toward the subject of the review is positive, and decreasing a review score when the reviewer's attitude toward the subject of the review is positive and the user's attitude toward the subject of the review is negative, wherein the attitude is positive when the subject of the review includes a feature indicated as preferred by the user or reviewer and negative when the subject of the review includes a feature indicated as not preferred by the user or reviewer, and wherein the adjusted review score for the one or more reviews is a weighted average of the review score, the relevance score, and the attitude score;
   calculating a subject score based on the adjusted review scores for each subject;
   generating a ranked list of subjects according to the subject score of each subject; and
   presenting the ranked list of subjects to the user via a user interface, wherein the adjusted review score for each subject being presented is presented to the user via the user interface.

2. The computer-implemented method of claim 1, wherein adjusting each review score further comprises utilizing natural language processing to analyze the one or more reviews.

3. The computer-implemented method of claim 2, wherein the user preferences include one or more user requirements.

4. The computer-implemented method of claim 3, further comprising:
   removing each subject from the ranked list of subjects that does not satisfy the one or more user requirements.

5. The computer-implemented method of claim 2, wherein the user preferences include one or more user interests, and wherein the subjects are ranked according to a degree to which each subject satisfies the one or more user interests.

6. The computer-implemented method of claim 1, wherein the subject score for each subject is further based on a vendor-provided description of the subject.

7. A computer system for processing reviews to generate personalized recommendations based on a user's preferences, the computer system comprising:
   one or more computer processors;
   one or more computer readable storage media;
   program instructions stored on the one or more computer readable storage media for execution by at least one of the one or more computer processors, the program instructions comprising instructions to:
   receive user preferences relating to a subject category;
   process a query, wherein in response to processing the query, one or more reviews for a plurality of subjects of the subject category are retrieved, wherein each review is associated with a review score;
   adjust each review score of the one or more reviews for each subject by modifying a value of the review score based on user preferences for a corresponding subject category, including a relevance score indicating a relevance of the subject of each review to the user preferences, and based on an attitude score indicating a similarity of an attitude of each review to a user's attitude toward the subject of the review, and wherein adjusting each review score of the one or more reviews further comprises increasing a review score when a reviewer's attitude toward the subject of the review is negative and the user's attitude toward the subject of the review is positive, and decreasing a review score when the reviewer's attitude toward the subject of the review is positive and the user's attitude toward the subject of the review is negative, wherein the attitude is positive when the subject of the review includes a feature indicated as preferred by the user or reviewer and negative when the subject of the review includes a feature indicated as not preferred by the user or reviewer, and wherein the adjusted review score for the one or more reviews is a weighted average of the review score, the relevance score, and the attitude score;
   calculate a subject score based on the adjusted review scores for each subject;
   generate a ranked list of subjects according to the subject score of each subject; and
   present the ranked list of subjects to the user via a user interface, wherein the adjusted review score for each subject being presented is presented to the user via the user interface.

8. The computer system of claim 7, wherein the instructions to adjust each review score further comprise instructions to utilize natural language processing to analyze the one or more reviews.

9. The computer system of claim 8, wherein the user preferences include one or more user requirements.

10. The computer system of claim 9, further comprising instructions to:
remove each subject from the ranked list of subjects that does not satisfy the one or more user requirements.

11. The computer system of claim 8, wherein the user preferences include one or more user interests, and wherein the subjects are ranked according to a degree to which each subject satisfies the one or more user interests.

12. The computer system of claim 7, wherein the subject score for each subject is further based on a vendor-provided description of the subject.

13. A computer program product for processing reviews to generate personalized recommendations based on a user's preferences, the computer program product comprising one or more computer readable storage media collectively having program instructions embodied therewith, the program instructions executable by a computer to cause the computer to, in response to executing the program instructions:
receive user preferences relating to a subject category;
process a query, wherein in response to processing the query, one or more reviews for a plurality of subjects of the subject category are retrieved, wherein each review is associated with a review score;
adjust each review score of the one or more reviews for each subject based on user preferences for a corresponding subject category, including a relevance score indicating a relevance of the subject of each review to the user preferences, and based on an attitude score indicating a similarity of an attitude of each review to a user's attitude toward the subject of the review, and wherein adjusting each review score of the one or more reviews further comprises increasing a review score when a reviewer's attitude toward the subject of the review is negative and the user's attitude toward the subject of the review is positive, and decreasing a review score when the reviewer's attitude toward the subject of the review is positive and the user's attitude toward the subject of the review is negative, wherein the attitude is positive when the subject of the review includes a feature indicated as preferred by the user or reviewer and negative when the subject of the review includes a feature indicated as not preferred by the user or reviewer, and wherein the adjusted review score for the one or more reviews is a weighted average of the review score, the relevance score, and the attitude score;
calculate a subject score based on the adjusted review scores for each subject;
generate a ranked list of subjects according to the subject score of each subject; and
present the ranked list of subjects to the user via a user interface, wherein the adjusted review score for each subject being presented is presented to the user via the user interface.

14. The computer program product of claim 13, wherein the instructions to adjust each review score further comprise instructions to utilize natural language processing to analyze the one or more reviews.

15. The computer program product of claim 14, wherein the user preferences include one or more user requirements.

16. The computer program product of claim 15, further comprising instructions to:
remove each subject from the ranked list of subjects that does not satisfy the one or more user requirements.

17. The computer program product of claim 14, wherein the user preferences include one or more user interests, and wherein the subjects are ranked according to a degree to which each subject satisfies the one or more user interests.

18. The computer program product of claim 13, wherein the subject score for each subject is further based on a vendor-provided description of the subject.

* * * * *